United States Patent
Ojima et al.

(10) Patent No.: US 7,184,229 B2
(45) Date of Patent: Feb. 27, 2007

(54) OPTICAL SWITCH ELEMENT

(75) Inventors: Takayuki Ojima, Kanagawa (JP); Kentaro Harase, Kanagawa (JP)

(73) Assignee: Oki Electric Cable Co., Ltd., Kanagawa (JP)

( * ) Notice: Subject to any disclaimer, the term of this patent is extended or adjusted under 35 U.S.C. 154(b) by 0 days.

(21) Appl. No.: 10/885,774

(22) Filed: Jul. 8, 2004

(65) Prior Publication Data
US 2005/0030650 A1    Feb. 10, 2005

(30) Foreign Application Priority Data
Aug. 5, 2003    (JP)    ............................. 2003-287166

(51) Int. Cl.
G02B 5/04    (2006.01)

(52) U.S. Cl. .................................. 359/835

(58) Field of Classification Search ................ 359/196, 359/212–214, 223–224, 831, 833, 834, 871, 359/872, 835, 836
See application file for complete search history.

(56) References Cited

U.S. PATENT DOCUMENTS

| | | | | |
|---|---|---|---|---|
| 3,434,073 A | * | 3/1969 | Forkner | 372/16 |
| 3,597,701 A | * | 8/1971 | Cornillault | 372/16 |
| 4,773,754 A | * | 9/1988 | Eisele | 356/139.05 |
| 6,407,975 B1 | * | 6/2002 | Takishima | 369/112.29 |
| 6,647,173 B2 | * | 11/2003 | Chen et al. | 385/18 |
| 2003/0021307 A1 | * | 1/2003 | Yamazaki | 372/24 |

* cited by examiner

Primary Examiner—Euncha P. Cherry
(74) Attorney, Agent, or Firm—Takeuchi & Kubotera, LLP

(57) ABSTRACT

An optical switch element (1) for switching an optical path (2) comprises a fixed reflection element (4), which requires strict preciseness in positioning and angle-setting, and a movable optical path parallel displacement element (3A), which permits relaxed preciseness in positioning and angle-setting. When the movable optical path parallel displacement element is not present in the optical path, light goes straight, and when the optical path displacement element is inserted into the optical path, light running in the optical path is displaced in parallel, inputted into the fixed reflection element, and bent by the fixed reflection element.

20 Claims, 4 Drawing Sheets

OPTICAL PATH PARALLEL
DISPLACEMENT ELEMENT
OF THE PRESENT INVENTION

CONVENTIONAL
REFLECTION ELEMENT

OPTICAL PATH PARALLEL
DISPLACEMENT ELEMENT
OF THE PRESENT INVENTION

CONVENTIONAL
REFLECTION ELEMENT

OPTICAL SWITCH ELEMENT

BACKGROUND OF THE INVENTION

1. Field of the Invention

The present invention relates to an optical switch element used in an optical switch for switching an optical path and capable of largely relaxing the processing preciseness, and the preciseness in positioning and angle setting of an optical element and a driving device, thus achieving small loss and high production yield.

2. Description of the Related Art

As shown in FIG. 3, in a conventional optical switch element 1', an input collimator 17' and an output collimator 18' are arranged on a base 7' and a driving solenoid 5' moves up and down to make a movable reflection mirror 9' get in and out of the crossing point of input and output optical paths so as to perform optical switch operation.

In the above conventional optical switch element, extremely severe preciseness in processing the movable reflection mirror 9' and a driving device, such as the driving solenoid 5', is required to precisely move a reflection device, such as the movable reflection mirror 9'. In addition, extremely strict preciseness in positioning and angle-setting of these elements is required.

SUMMARY OF THE INVENTION

Accordingly, it is an object of the present invention to provide an optical switch element capable of largely relaxing such severe preciseness requirements for processing and also for positioning and angle-setting of the optical element and the driving device.

In order to achieve the object, according to an aspect of the present invention, an optical switch element for switching an optical path comprises a fixed reflection element, which requires strict preciseness in positioning and angle-setting, and a (first) movable optical path parallel displacement element, which permits relaxed preciseness in positioning and angle-setting. When the movable optical path parallel displacement element is not present in the optical path, light goes straight, and when the optical path displacement element is inserted into the optical path by a driving means, light running in the optical path is displaced in parallel, inputted into the fixed reflection element, and bent by the fixed reflection element. Thus, the optical switch element switches the optical path or light between the two different conditions.

According to another aspect of the invention, the optical switch element further comprises another (second) movable optical path parallel displacement element for displacing in parallel the optical path, which has been bent by the fixed reflection element, to a height different from the height of the optical path bent by the fixed reflection element.

According to still another aspect of the present invention, the height of the optical path outputted from the second optical path parallel displacement element is made the same as that of the optical path inputted into the first optical path displacement element.

It is preferred that the driving means for inserting the first and second optical path displacement elements are integrated into a single common driving means.

The optical path may be bent at right angles by the fixed reflection element.

DESCRIPTION OF THE PREFERRED EMBODIMENTS

An optical switch element according to embodiments of the present invention will now be described with reference to the accompanying drawings. In the present invention, a reflection element, which requires strict positioning and angler setting, is fixed and an optical path parallel displacement element, which permits relaxed preciseness in positioning and angle setting, is made movable, while in the conventional method, a reflection element is made movable.

(First Embodiment)

In an optical switching element 1 according to the first embodiment, a reflection element, which requires strict preciseness in positioning and angle-setting, is fixed and an optical path parallel displacement element, which permits relaxed preciseness in the positioning and angle-setting, is made movable. The optical switch element switches the first condition, wherein light goes straight since the optical path parallel displacement element is not in the optical path, and the second condition, wherein light is displaced or translated in parallel in the optical path and enters the fixed reflection element and changes its passing angle when the optical path parallel displacement element gets in the optical path by a driving device.

Figure 1A:
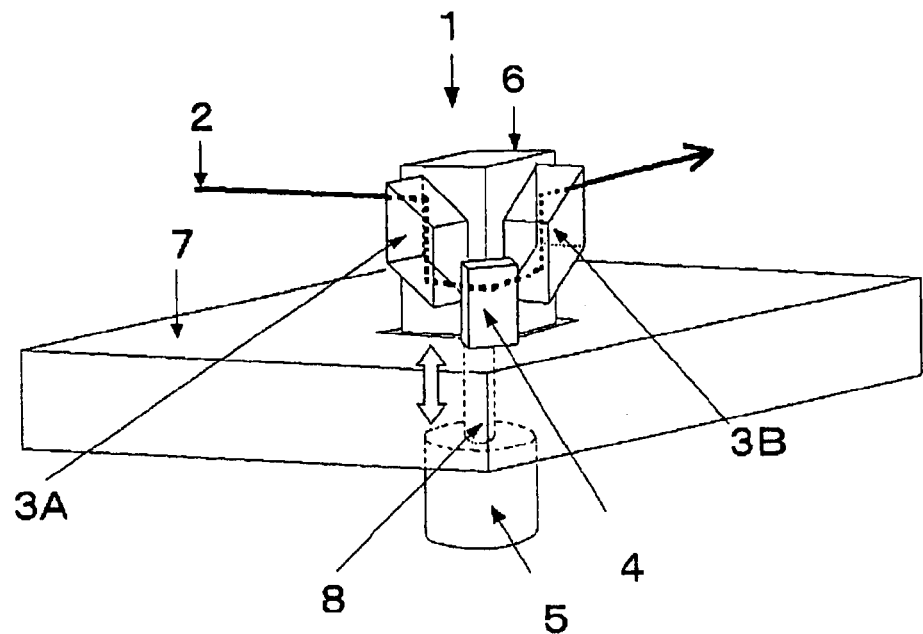
FIG. 1(A) is an illustration of an optical switch element according to an embodiment of the present invention, wherein an optical path passes through a prism and a mirror.
Figure 1B:
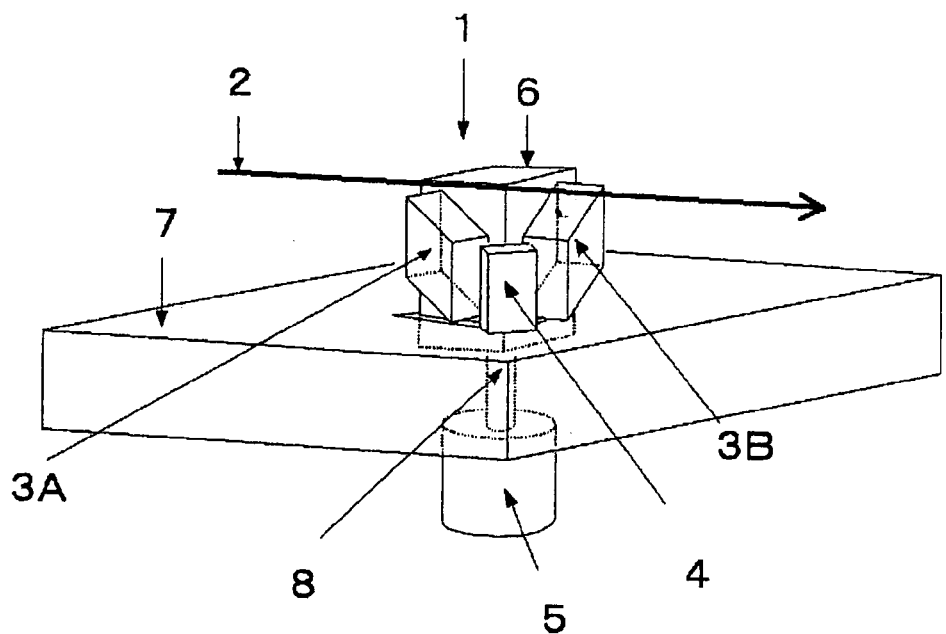
FIG. 1(B) is an illustration of the optical switch element according to the embodiment of the present invention, wherein the optical path goes straight without passing through the prism and the mirror.

The first embodiment has a structure shown in FIGS. 1(A) and (B) without a second movable optical path parallel displacement prism 3B. FIG. 1(A) shows the condition that an optical path 2 passes through a first movable optical path parallel displacement prism 3A and a mirror 4, while FIG. 1(B) shows the condition that the optical path 2 goes straight without passing though the prism 3A and the mirror 4. The optical switch element 1 according the first embodiment comprises the first movable optical path parallel displacement prism 3A for displacing the optical path in parallel, the fixed reflection mirror 4 for bending light at right angles, a movable block 6, a driving solenoid 5 for moving the movable block 6, a shaft 8 for transmitting motive power from the movable solenoid 5 to the movable block 6, and a base 7 for fixing the fixed reflection mirror 4. When the height of the optical path from the fixed reflection mirror 4 is not required to be changed, the second movable optical path parallel displacement prism 3B can be omitted.

(Second Embodiment)

In FIGS. 1(A) and 1(B), an optical switch element 1 according to the second embodiment comprises the first movable optical path parallel displacement prism 3A for displacing the optical path in parallel, the second movable optical path parallel displacement prism 3A for similarly displacing the optical path 3B, the fixed reflection mirror 4 for bending the optical path at right angles, the movable block for integrally fixing the first and second movable optical path parallel displacement prisms 3A and 3B, the driving solenoid 5 for moving the movable block 6, the shaft 8 for transmitting motive power from the movable solenoid 5 to the movable block 6, and the base 7 for fixing the fixed reflection mirror 4.

In the above structure, the optical path 2 is displaced in parallel by the first movable optical path parallel displacement prism 3A and inputted into the fixed reflection mirror 4. Then, after changing its direction at right angles, the optical path 2 is inputted into the second movable optical path parallel displacement prism 3B, and displaced in parallel by the second movable optical path parallel displacement prism 3B so as to be outputted at the same height level as when the optical path 2 is inputted into the first movable optical path parallel displacement prism 3A. At this point, however, it is not required that the height level of the optical path 2 outputted from the second movable optical path parallel displacement prism 3B is the same as that of the height level of the optical path 2 inputted into the first movable optical path parallel displacement prism 3A.

(Third Embodiment)

In the optical switching element 1 according to the third embodiment, the height level of the optical path 2 outputted from the second movable optical path parallel displacement prism 3B is the same as that of the height level of the optical path 2 inputted into the first movable optical path parallel displacement prism 3A. Since the optical path 2 has the same height when it is inputted into and outputted from the optical switch element 1, the structure of the optical switch element 1 is simplified, thus enabling easy assembling.

(Fourth Embodiment)

In the optical switching element 1 according to the fourth embodiment, the driving device for the first and second movable optical path parallel displacement prisms 3A and 3B is integrated to a single common driving device. In order to switch the condition that the optical path is bent and the condition that the optical path goes straight, the first and second movable optical path parallel displacement prisms 3A and 3B are integrally fixed to the movable block 6 and the motive power from the driving solenoid 5 is transmitted to the movable block 6 by the shaft 8 so as to move the movable block 6 up and down.

When the driving device is integrated to a single common device, more desirable result is obtained. From the point view of design, however, independent driving solenoids may be used respectively, for the first and second movable optical path parallel displacement prisms 3A and 3B. Also, other driving means may be used instead of the driving solenoid 5. In addition, in the above embodiment, the movable block 6 including the first and second movable optical path parallel displacement prisms 3A and 3B is moved in the up-and-down (vertical) direction. However, it may be moved in the left-and-right (lateral) direction or moved in a rotation.

(Fifth Embodiment)

In the fifth embodiment, the fixed reflection element of the optical switch element 1 according to one of the first to fourth embodiments is arranged such that the optical path is bent at right angles by the fixed reflection element. Although when the optical path is bent at right angles, the structure of the optical switch element is simplified and the assembly work is easy, it is not required that the optical path is bent at right angles.

Figure 2A:
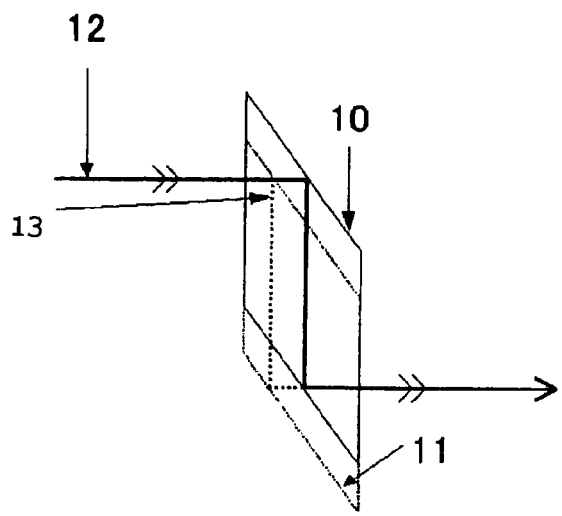
FIG. 2(A) is an illustration showing positional discrepancies of an optical path parallel displacement element in an movable section according to the present invention and a conventional reflection element.
Figure 2A:
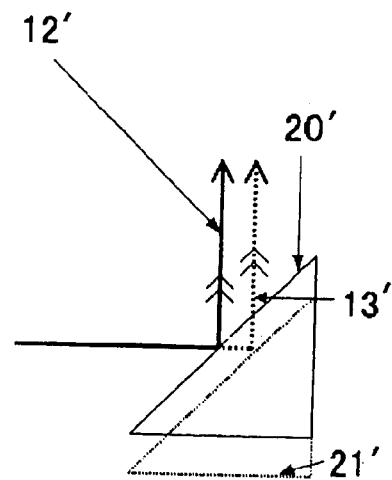

In FIG. 2(A), reference numeral 12 denotes an optical path under a condition 10 without a positional discrepancy of the optical path parallel displacement element used in the movable section of the present invention and reference numeral 13 denotes an optical path under a condition 11 having a positional discrepancy of the optical path parallel displacement element. As shown in FIG. 2(A), even if the optical path parallel displacement element has a positional discrepancy, the optical path has no positioning or angular discrepancy. And it is so even when the optical path parallel displacement element has a positional discrepancy in any direction.

In FIG. 2(A), reference numeral 12' denotes an optical path under a condition 20' without a positional discrepancy of the reflection element used in the conventional movable section and reference numeral 13' denotes an optical path under a condition 21' having a positional discrepancy of the reflection element. When there is a positioning discrepancy of the reflection element, a positioning discrepancy occurs between the optical paths 12' and 13'. This is true for the positioning discrepancy in all directions except for the direction perpendicular to the base.

Figure 2B:
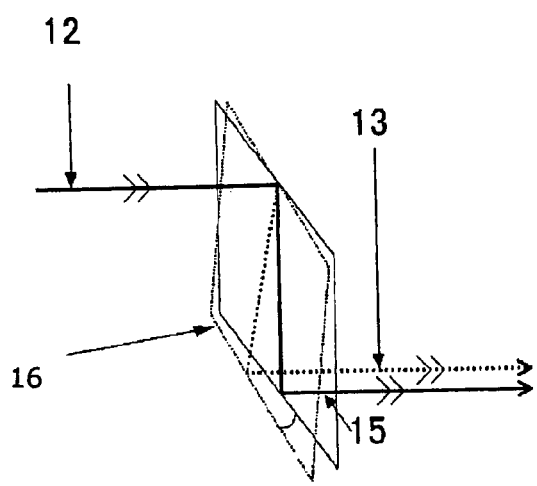
FIG. 2(B) is an illustration showing angular discrepancies of an optical path parallel displacement element in an movable section according to the present invention and a conventional reflection element.
Figure 2B:
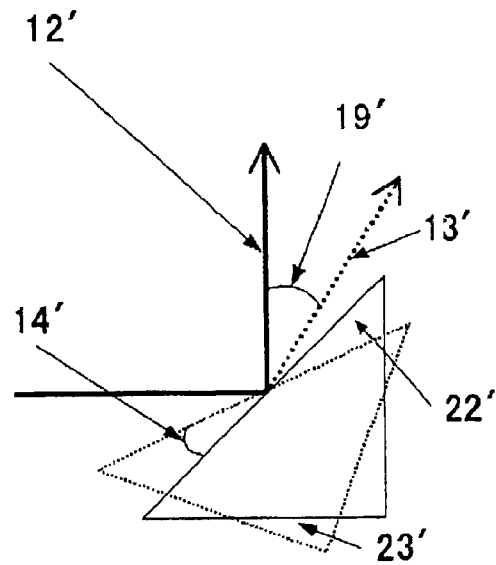
Figure 3:
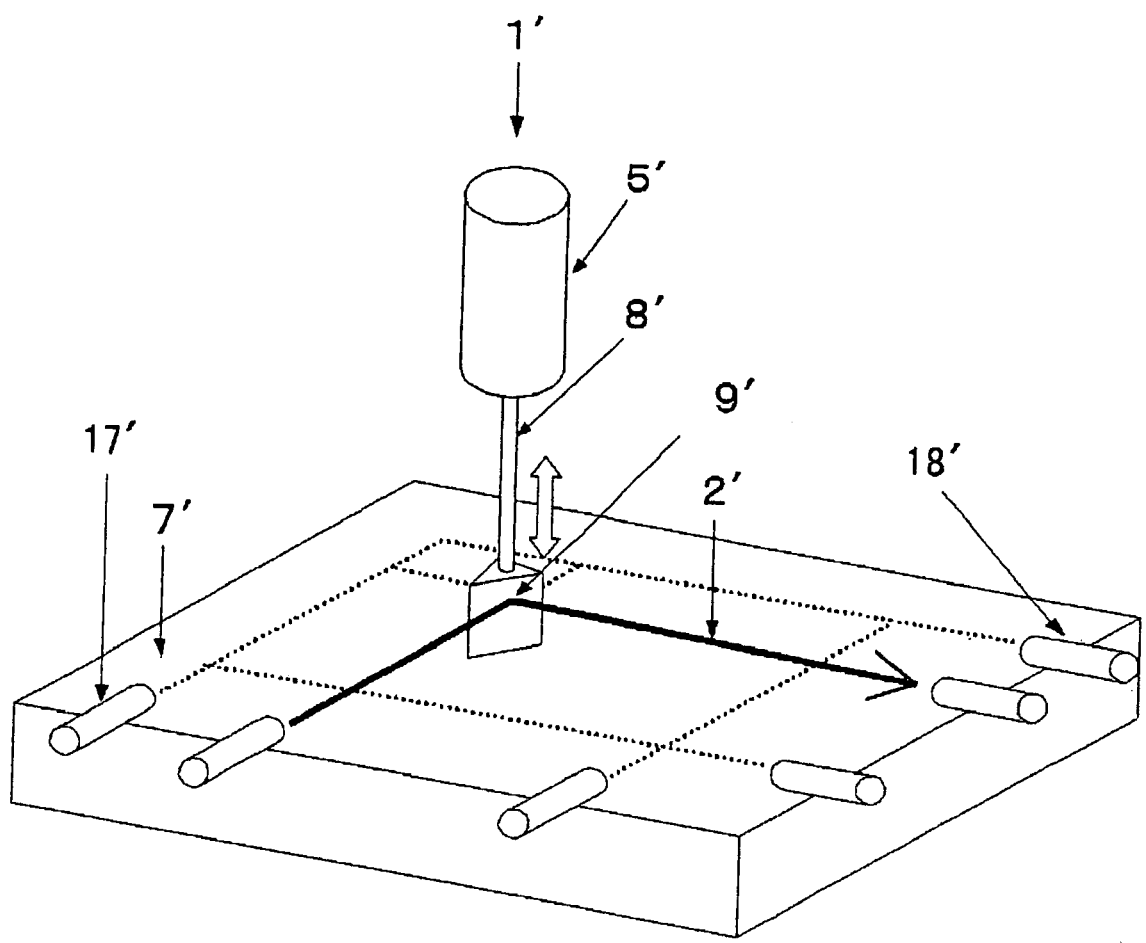
FIG. 3 is a conventional optical switch element, wherein an optical path passes through a movable reflection mirror.

In FIG. 2(B), reference numeral 12 denotes an optical path under a condition 15 without an angular discrepancy of the optical path parallel displacement element used in the movable section of the present invention and reference numeral 13 denotes an optical path under a condition 16 having an angular discrepancy of the optical path parallel displacement element. As shown in FIG. 2(B), even if the optical path parallel displacement element has an angular discrepancy, the optical path has no angular discrepancy although it has a positioning discrepancy. And it is so even when the optical path parallel displacement element has an angular discrepancy in any direction.

In FIG. 2(B), reference numeral 12' denotes an optical path under a condition 22' without an angular discrepancy of the reflection element used in the conventional movable section and reference numeral 13' denotes an optical path under a condition 23' having an angular discrepancy of the reflection element. When there is an angular discrepancy of the reflection element, an angular discrepancy occurs between the optical paths 12' and 13' when outputted. An angular discrepancy 19' between the optical paths 12' and 13' is two times an angular discrepancy 14' of the reflection element. This is true for the angular discrepancy in any direction. It is noted that the optical loss depends upon the angular discrepancy rather than the positioning discrepancy.

As described above, the optical path parallel displacement element according to the present invention permits a relaxed positioning and angular discrepancies to large extent compared with the conventional reflection element.

In an experiment, in a state that the angles of the optical switches 1 and 1' were deviated in the horizontal and vertical directions with respect to the base, the optical losses of the optical switch element 1 according to the present invention and the conventional optical switch element 1' were measured. Here, a fixed input collimator and a fixed output collimator were used in the measurement. The dominant factor for the increase of the optical loss is the angular discrepancy rather than the positioning discrepancy. Accordingly, if the increase of the optical loss of the optical switch element 1 is small with respect to the angular discrepancy, it means that the optical switch element 1 allows relaxed preciseness in processing, positioning and angle-setting of the optical element and driving device. The measurement results with respect to the angular discrepancies in the horizontal and vertical directions are shown in FIGS. 4(A) and 4(B), respectively.

Figure 4A:
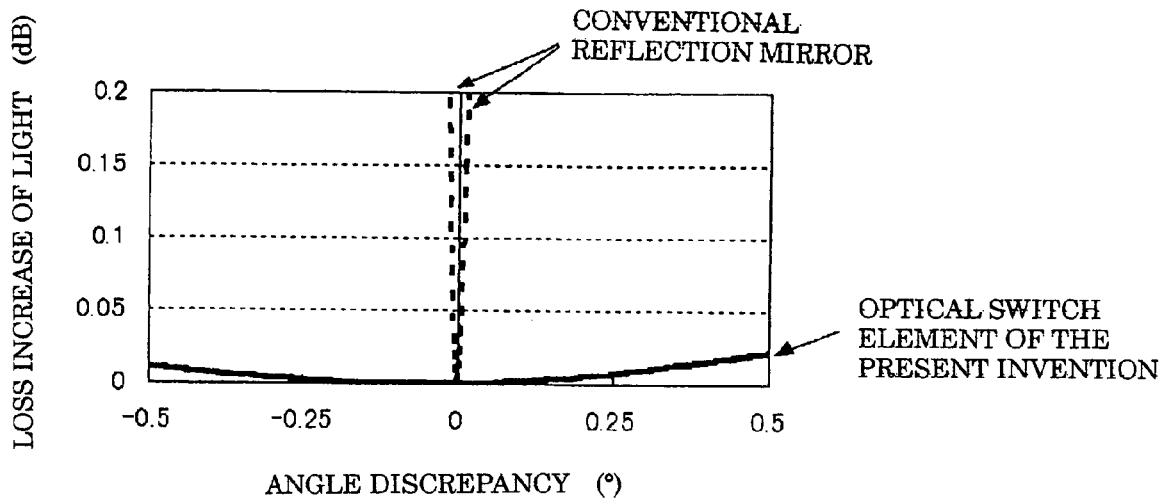
FIGS. 4(A) and 4(B) are graphs showing optical losses with respect to angular discrepancies in horizontal and vertical direction, respectively.
Figure 4B:
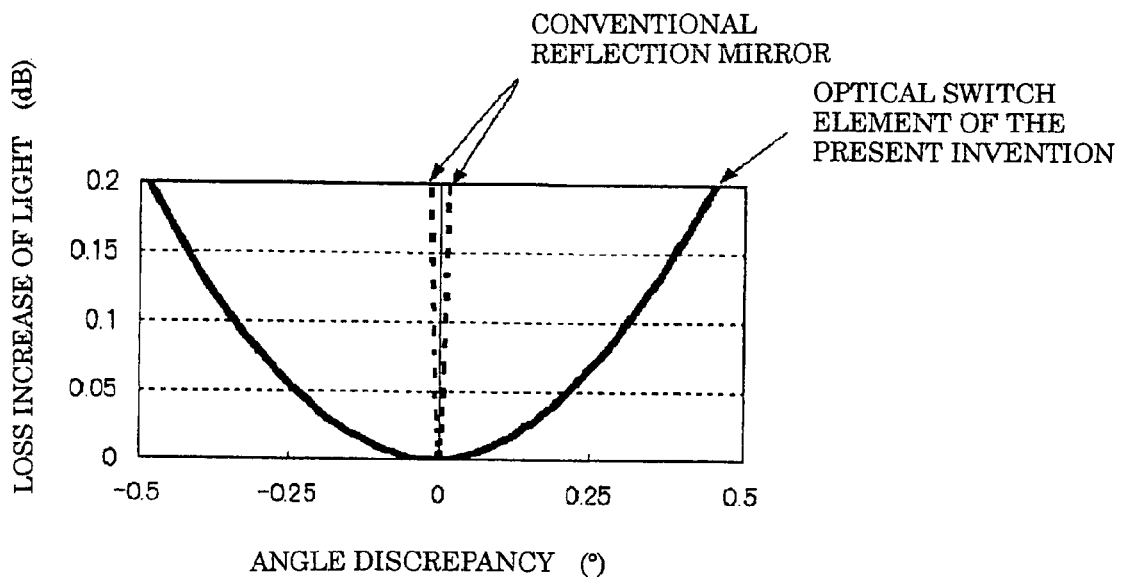

As shown in FIGS. 4(A) and 4(B), the increase in the optical loss of the optical switch element 1 according to the present invention is smaller than that of the conventional optical switch element 1' with respect to the angular discrepancy. That is, the optical switch element according to the present invention permits relaxed processing preciseness and relaxed positioning and angular setting of the optical element and driving device.

In the above embodiments, the fixed reflection mirror and the optical path parallel displacement prism are described as samples. However, the fixed reflection mirror 4 may be replaced by, for example, any means for changing the angle of the optical path, such as a pentaprism. Also, the first and second movable optical path parallel displacement prisms 3A and 3B may be replaced by, for example, any device in which two mirrors are arranged in parallel facing to each other for translating the optical path in parallel. Thus, the present invention includes various modifications.

Thus, the optical switch element according to the present invention is used in a optical switch for switching the optical path and enables the relaxation of the strict preciseness required in the conventional optical switch element.

The invention claimed is:

1. An optical switch element for switching an optical path, comprising:
   a reflection element for changing an angle of said optical path; and
   an optical path displacement element for displacing said optical path from a first path to a second path toward the reflection element such that the first path is situated in parallel to the second path at a position different from that of the second path, wherein said reflection element is fixed to be stationary and said optical path displacement element is made movable between a first position where the optical path displacement element is in the optical path and a second position where the optical path displacement element is out of the optical path.

2. The optical switch element according to claim 1, further comprising
   a driving device for driving said optical path displacement element such that said optical path displacement element moves in and out of said optical path.

3. The optical switch element according to claim 1, wherein said reflection element is arranged such that said optical path is bent at a right angle.

4. The optical switch element according to claim 1, wherein said optical path displacement element includes a first reflection surface and a second reflection surface, said first reflection surface being arranged in parallel to the second reflection surface.

5. The optical switch element according to claim 1, wherein said optical path displacement element is arranged such that the first path is situated at a first position away from a reference position by a first distance and the second path is situated at a second position away from the reference position by a second distance different from the first distance.

6. The optical switch element according to claim 2, wherein said drive device drives the optical path displacement element such that the optical path displacement element moves linearly perpendicular to the optical path.

7. The optical switch element according to claim 1, wherein said optical path displacement element is arranged such that the optical path displacement element is situated away from the reflection element with a specific distance therebetween.

8. An optical switch element for switching an optical path, comprising:
   a fixed reflection element for changing an angle of said optical path, said fixed reflection element being fixed to be stationary;
   a first movable optical path displacement element for displacing said optical path from a first path to a second path toward the fixed reflection element, said first path being situated in parallel to the second path at a position different from that of the second path;
   a second movable optical path displacement element disposed on the optical path extending from the fixed reflection element for displacing said optical path from a third path to a fourth path, said third path being situated in parallel to the fourth path at a position different from that of the fourth path; and
   a driving device for driving said first and second movable optical path displacement elements such that said first and second movable optical path displacement elements move in and out of said optical path.

9. The optical switch element according to claim 8, wherein said first movable optical path displacement element and said second movable optical path displacement element are arranged such that the first optical path is situated at a height same as that of the fourth optical path.

10. The optical switch element according to claim 8, wherein said driving device includes a single common driving device.

11. The optical switch element according to claim 8, wherein said driving device includes a first driving device for driving the first movable optical path displacement element and a second driving device for driving the second movable optical path displacement element.

12. The optical switch element according to claim 8, wherein said fixed reflection element is arranged such that said optical path is bent at a right angle.

13. The optical switch element according to claim 8, wherein said first movable optical path displacement element includes a first reflection surface and a second reflection surface, said first reflection surface being arranged in parallel to the second reflection surface.

14. The optical switch element according to claim 8, wherein said second movable optical path displacement element includes a first reflection surface and a second reflection surface, said first reflection surface being arranged in parallel to the second reflection surface.

15. The optical switch element according to claim 8, wherein said first movable optical path displacement element is arranged such that the first path is situated at a first position away from a reference position by a first distance and the second path is situated at a second position away from the reference position by a second distance different from the first distance.

16. The optical switch element according to claim 15, wherein said second movable optical path displacement element is arranged such that the third path is situated at a third position away from a reference position by a third distance and the fourth path is situated at a fourth position away from the reference position by a fourth distance different from the third distance.

17. The optical switch element according to claim 16, wherein said first movable optical path displacement element and said second movable optical path displacement element are arranged such that a difference between the first distance and the second distance becomes equal to a difference between the third distance and the fourth distance.

18. The optical switch element according to claim 8, wherein said first movable optical path displacement element and said second movable optical path displacement element are arranged such that the first optical path is situated on a straight line different from that on which the fourth optical path is situated.

19. The optical switch element according to claim 8, wherein said drive device drives the first movable optical path displacement element and the second movable optical path displacement element such the first movable optical path displacement element and the second movable optical path displacement element move linearly perpendicular to the optical path.

20. The optical switch element according to claim 8, wherein said first movable optical path displacement element and said second movable optical path displacement element are arranged such that the first movable optical path displacement element and the second movable optical path displacement element are situated away from the fixed reflection element with a specific distance therebetween.

* * * * *